July 2, 1957 W. F. LASER 2,797,939
SELF-CONTAINED CARTRIDGE TYPE ROTARY SEAL WITH
FLOATABLY MOUNTED SEALING MEMBERS
Filed May 18, 1954 2 Sheets-Sheet 2

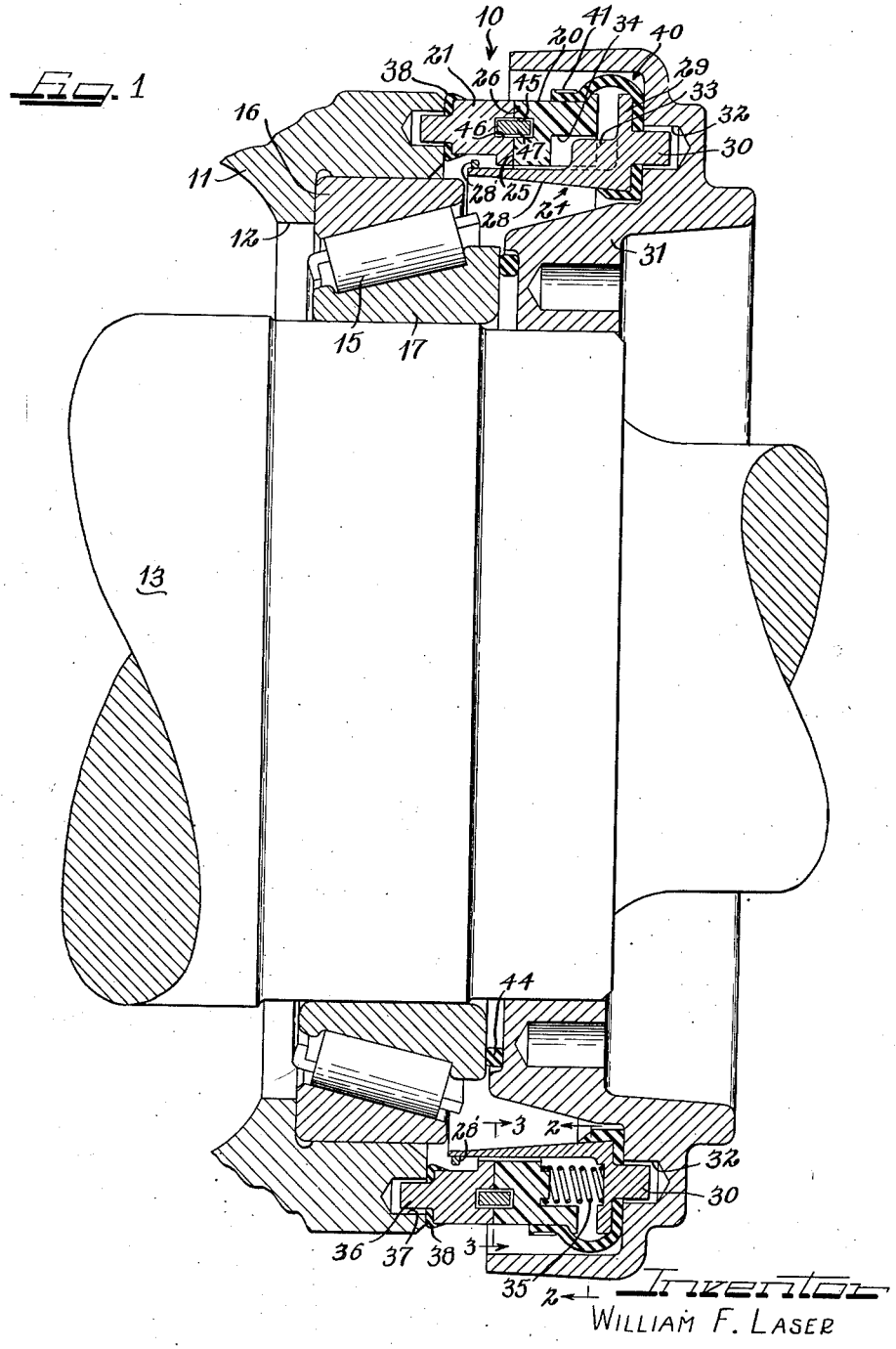

Inventor
WILLIAM F. LASER
by Carlson, Pitzner, Hubbard & Wolfe
Attys.

United States Patent Office 2,797,939
Patented July 2, 1957

2,797,939

SELF-CONTAINED CARTRIDGE TYPE ROTARY SEAL WITH FLOATABLY MOUNTED SEALING MEMBERS

William F. Laser, Hinsdale, Ill., assignor to City National Bank and Trust Company of Chicago, as trustee Application May 18, 1954, Serial No. 430,533

2 Claims. (Cl. 286—11)

The present invention relates in general to rotary seals for preventing the escape of fluid from within, and the entry of foreign matter into a machine housing through an opening in the housing for a relatively rotatable part, such as a shaft. More particularly, the invention relates to rotary seals of the type having relatively rotating, rubbing surfaces lapped to a high degree of flatness to prevent the passage of matter therebetween.

It is the general aim of the invention to provide an improved rotary seal of the foregoing type which is extremely simple and economical in construction, yet especially reliable in operation, the relatively rotatable sealing members thereof being maintained in radial alinement by a novel arrangement which at the same time increases the sealing efficiency.

Another object of the invention is the provision of such a seal in which the relatively rotatable sealing members are each floatably mounted with respect to their corresponding relatively rotatable machine parts so as to be substantially immune to thermally or mechanically induced distortions of the latter, but in which the two sealing members are maintained radially alined with freedom to shift axially for take-up of wear.

It is a further object of the invention to provide a self-contained, cartridge type rotary seal having the improved features described above.

Figure 4:
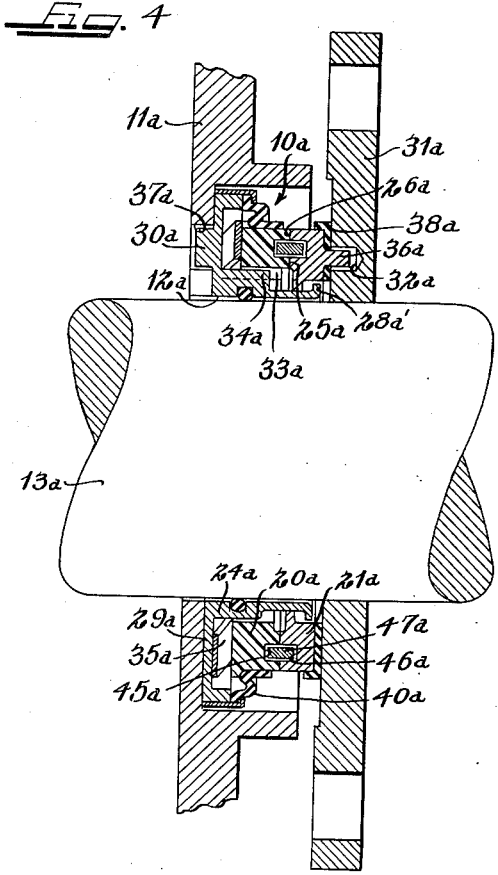
Figure 3:
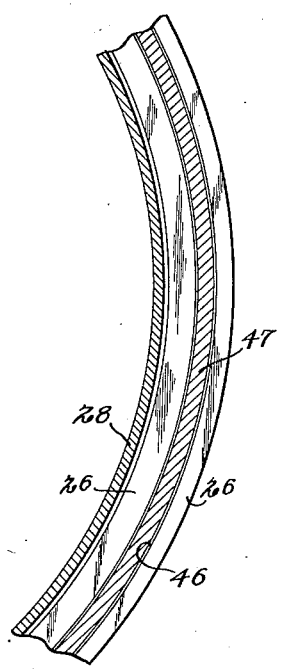
Figure 2:
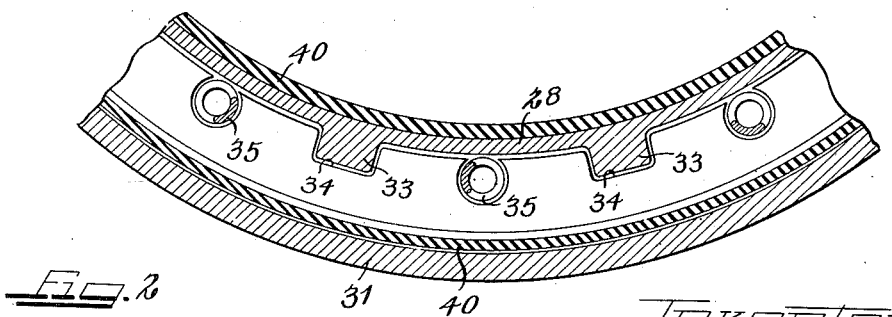

Additional objects and advantages will become apparent as the following description proceeds, taken in conjunction with the accompanying drawings, in which:

Figure 1 is a cross-sectional view of a rotary seal embodying the features of the invention and illustrated as employed between a machine housing and a shaft journaled in and extending through the housing;

Figs. 2 and 3 are fragmentary sections taken substantially along the respective lines 2—2 and 3—3 in Fig. 1; and Fig. 4 is similar to Fig. 1, illustrating a second embodiment of the invention.

Although the invention has been shown and is described in some detail with reference to particular embodiments thereof, there is no intention that it thus be limited to such detail. On the contrary, it is intended here to cover all alterations, modifications, and equivalents falling within the spirit and scope of the invention as defined by the appended claims.

Referring now to the drawings, an exemplary self-contained cartridge type rotary seal 10, here shown as embodying the features of the invention, is employed in connection with two relatively rotatable machine parts illustrated as a housing 11 having an opening 12 through which a rotatable shaft 13 extends. Since the housing 11 and shaft 13 may be parts of any one of a wide variety of machines, they are only fragmentarily illustrated in Fig. 1. The shaft is journaled in the housing by any suitable means, here a tapered roller type bearing 15 having an outer race 16 fast in a shouldered recess of the housing and an inner race 17 fast on the shaft. While the rotary seal 10 may be employed to prevent the transfer of any matter, whether gaseous, liquid, or solid particles, it is intended in the illustrated application to prevent the escape of lubricant for the bearing 15 from within the housing 11, and at the same time to prevent the entry of water, grit, or other foreign matter into the housing where it might seriously damage the bearing 15 or other accurately machined interengaging parts such as gears or the like.

As its principal components, the seal 10 comprises two relatively rotatable sealing members 20 and 21 which are adapted, in a manner to be described, for fluid-tight yet shiftable attachment to the respective rotatable machine parts exemplified by the housing 11 and shaft 13. For accomplishing such mounting, the seal 10 further includes a base member 24 adapted for attachment to one of the machine parts and floatably mounting the sealing member 20 with freedom for limited axial and rotational adjustment, as well as mounting the second sealing member 21 with complete freedom for relative rotation and, within certain limits, axial movement. The second sealing member 21 is adapted for attachment to the second machine part so that the two members 20, 21 rotate relative to one another with their opposed radially extending end surfaces 25, 26 rubbing in sealing contact, means being provided to bias the surfaces into firm abutting engagement.

In the successful construction of such a rotary seal, it is necessary that the cooperating sealing surfaces 25, 26 be perfectly flat and smooth in order that the space existing therebetween is so small as to prevent the transfer of molecular particles therebetween. For example, in a seal for successfully containing lubricating oil, which may have a molecular size as low as 25 millionths of an inch in diameter, the two surfaces 25, 26 are lapped to such a high degree of smoothness that the irregularities therein do not exceed 10 millionths of an inch. Further the surfaces 25, 26 must be perfectly flat, that is, perfectly planar so that the opening existing between the mating surfaces does not exceed approximately 15 millionths of an inch. The foregoing example strikingly illustrates the necessity for maintaining the two surfaces 25, 26 perfectly smooth and flat under all conditions of use which the seal might encounter. It is, therefore, necessary to more or less isolate the sealing members 20, 21 from their respective machine parts so that thermally or mechanically induced distortions of the latter will not warp the sealing surfaces and destroy their efficiency. In letting the two sealing members 20, 21 "float" relative to their respective machine parts so as to thus preclude such warping of the sealing surfaces, it becomes necessary to prevent their freedom from affording opportunity for misalinement of the two surfaces in a radial direction; if the surfaces 25 and 26 do not remain radially alined but only partially engage one another, the sealing action of a part of their area is lost.

It is to the solution of this difficulty that the present invention is directed. In the practice of the invention, the two sealing members 20, 21 are floatably mounted with freedom for shifting both axially and radially relative to their respective machine parts, thus being substantially free of warping which might arise as a result of thermal or mechanical distortions of the machine parts. At the same time, means are provided which lock the two sealing members 20, 21 together in a radial direction while permitting relative rotation thereof, so that the sealing surfaces 25, 26 remain totally registered in sliding contact as the sealing members 20, 21 shift relative to their respective machine parts to compensate for any distortions in the latter. As an incident to the provision of such radial alinement means, the invention also provides an arrangement which materially increases the sealing efficiency of the surface contact by creating a tortuous path impeding the transfer of the sealed substance, such as oil, or foreign particles between the inner and outer radial edges of the sealing surfaces. Moreover, the foregoing advantages achieved through the practice of the invention are readily embodied in a self-contained cartridge type seal of the type here shown.

In somewhat more detail, the base 24 is a relatively light, annular member suitably formed as by stamping or forging sheet metal stock. It includes an axially extending wall portion 28 and an outwardly extending radial end wall portion 29, the latter having on its outer surface a plurality of pins 30 for mounting the base on a flange 31 suitably fixed to the shaft 13 for rotation therewith. For this purpose, the flange 31 includes therein a plurality of circularly spaced recesses 32 adapted to receive the respective pins 30. As clearly illustrated, the recesses 32 are oversize with respect to the pins 30 so that there is a lost-motion connection between the flange 31 and the base 24, permitting the latter to shift for automatic alinement even if the flange 31 or shaft 13 is mechanically or thermally distorted. The first sealing member 20 is annular in form and concentrically disposed around the axial wall 28. For mounting the member 20 for rotation with, but axial movement relative to, the base 24, the latter is provided with a plurality of circularly spaced keys 33 located to register with and to fit loosely into a corresponding plurality of circularly spaced keyways 34 defined in the right end of the member 20 (Fig. 1). It will be observed from Fig. 2 that the keys 33 are somewhat undersize with respect to the keyways 34 so that the sealing member 20 is not rigidly connected with the base 24. This loose fit, while preventing relative rotation of the base 24 and sealing member 20, affords slight shifting between the two parts as may be required upon thermal or mechanical distortion of the flange 31 and base 24. In such event, the sealing member 20 is not subjected to undue stresses since it is only loosely connected with the base 24, its sealing surface 25 thereby remaining perfectly flat and undistorted under adverse conditions.

For biasing the sealing member 20 to the left (as viewed in Fig. 1) to thereby effect a firm sealing engagement between the surfaces 25, 26, a plurality of coiled compression springs 35 are interposed between the inner surface of the radial wall 29 and a corresponding plurality of spring recesses defined in the right face of the sealing member 20. As shown best in Fig. 2, the springs 35 are circularly spaced and alternately disposed between the several keys 33 and keyways 34, there being a slight recess (Fig. 1) in the inner face of the radial wall 29 to seat each of the springs and an upstanding boss in each of the spring recesses for locating and receiving the opposite end of each spring.

The second sealing member 21 is annular in shape and concentrically disposed around the radial wall 28 of the base 24, having complete freedom for rotational and axial movements relative to the latter. The inner sealing surface 26 of the second sealing member 21 is thus directly opposite the sealing surface 25, as illustrated, and the two surfaces are biased into firm engagement by the springs 35. In order to prevent the removal or loss of the second sealing member 21 when the entire seal 10 is removed from a machine, a radially outturned lip 28' is fixed to or formed integrally with the wall 28 at its left extremity, such lip being adapted to engage a shoulder on the sealing member 21 and to retain it against the force of the springs 35. For connecting the second sealing member 21 by lost-motion means to be held stationary with the housing 11, its outer end surface is provided with a plurality of circularly spaced pins 36 which are insertable into a corresponding plurality of oversize recesses 37 appropriately located in the housing. Preferably a yieldable, resilient gasket 38 is interposed between the sealing member 21 and the housing 11 and the pins 36 are made undersize with respect to the openings 37 so that thermal expansion or mechanical distortion of the housing does not correspondingly distort the sealing member and warp its accurately lapped flat sealing surface 26.

In order to prevent the loss of sealed fluid or lubricant between the loosely fitting and relatively movable base 24 and sealing member 20, a sleeve or boot 40 of flexible material is suitably connected at its opposite marginal edges between the two parts. As here shown, the boot 40 has an axially extending portion with its marginal end bonded to the peripheral surface of the sealing member 20, there being also a circular clamping band 41 locking the boot in place as shown. Secondly, the boot includes a radially inturned portion which overlies the rear surface of the radial wall 29, there being a plurality of openings in the boot through which the several mounting pins 30 extend. By this construction, the boot effectively prevents the transfer of fluid between the sealing member 20 and the base 24, yet it permits relative axial movement of the two by virtue of its flexibility and the slack material provided in its axial portion. Moreover, the inturned radial portion of the boot provides an efficient gasket interposed between the flange 31 and the right or outer base of the radial wall 29. The gasket thus provided by the boot prevents the loss of sealed fluid between the engaging parts of the base 24 and flange 31.

In the installation of the cartridge seal 10, it is only necessary that the flange 31 be pulled axially from the exposed or right end of the shaft 13. The cartridge seal, with the springs 35 biasing the sealing members 20, 21 until the latter is engaged with the lip 28' may then be inserted in place on the housing 11 by slipping the pins 36 into the registering recesses 37. The flange 31 may then be replaced on the shaft 13, the pins 30 on the outer face of the radial wall 29 slipping into the corresponding recesses 32. Preferably at this time, a resilient O-ring 44, of rubber or like material, is placed between the inner race 17 and the inner face of the flange 31 to prevent the loss of fluid therebetween and out along the shaft 13. With the flange 31 thus located, the base 24 is shifted inwardly so that the springs 35 are compressed and the sealing member 21 is shifted free of the retaining lip 28'.

In keeping with the invention, means are interposed between the two sealing members 20, 21 in a manner to maintain their coacting surfaces 25, 26 in radial alinement even though each is free to shift relative to its corresponding machine part, that is, even though the sealing member 20 is free to shift relative to the base 24 and flange 31, and the sealing member 21 is free to shift slightly relative to the housing 11. While the two sealing members 20, 21 may move axially for self-adjustment, they are thus "tied together" in a radial direction and move in unison whenever radial adjustment relative to their supporting parts is necessary.

In accomplishing this result, a pair of registering grooves 45, 46 are provided in the respective sealing surfaces 25, 26 and an auxiliary ring 47 is placed with its opposite ends in respective ones of the grooves. This creates a tortuous path between the radially inner and outer edges of the sealing surfaces, thus providing, in addition to the radial alinement described, an increased impediment to the loss of lubricant from the housing 11.

As illustrated in Fig. 1, the grooves 45, 46 are rectangular in cross section, and the ring 47 is correspondingly rectangular, its axial length being slightly less than the combined depth of the grooves. The bias of the springs 35 thus brings the surfaces 25, 26 into firm rubbing engagement. The width of the ring 47 is also slightly less than the width of the two registering grooves, 45, 46, so that the ring "floats" within the grooves and has very slight clearance with the walls of the latter. However, any tendency for one of the sealing members 20, 21 to shift radially relative to the other brings the ring 47 into engagement with the side walls of the grooves where it effectively precludes such relative movement. Thus, if the members 20, 21 shift radially relative to their supporting parts, they are constrained to shift in unison and their mating sealing surfaces 25, 26 are maintained in coextensive sealing engagement.

It is believed that the operation of the cartridge seal 10 will be apparent from the foregoing description. However, a brief summary may be helpful. As the shaft 13 rotates relative to the housing 11 on the bearing 17, the flange 31 is rotated in unison with the shaft and carries with it the base 24 and the first sealing member 20. The second sealing member 21 is maintained stationary by virtue of its pin engagement at 36, 37 with the housing 11. Accordingly, the accurately lapped surface 25, biased into firm engagement with the mating surface 26, rotates relative to the latter surface in firm sealing engagement. Oil contained in the housing 11 and circulating around the bearing 15 cannot escape from the housing because: (a) the resilient O-ring 44 precludes the loss of oil between the inner race 17 and the flange 31; (b) the radially inturned portion of the boot 40 serves as a gasket preventing the loss of oil between the radial wall 29 and the flange 31; (c) the resilient gasket 38 prevents the loss of oil between the adjacent surfaces of the housing 31 and sealing member 21; (d) the axially extending portion of the boot 40 sealed at its marginal edge to the periphery of the sealing member 20 prevents the loss of oil between the member 20 and the base 24; and (e) the rubbing engagement of the accurately lapped smooth, flat surfaces 25, 26 precludes the loss of oil therebetween.

By virtue of the looseness with which the sealing members 20 and 21 are mounted respectively on the base 24 and the housing 11, they may shift relative to their respective mounting parts when the latter are distorted under thermally or mechanically adverse conditions. The two sealing members 20, 21 are, in effect, only restrained against rotation relative to the base 24 and the housing 11 respectively, having freedom to shift radially and axially, within limits, of these respective parts. This is particularly advantageous in preventing distortion of the accurately lapped, smooth, flat sealing surfaces 25, 26 and the consequent destruction of their sealing ability. However, through the provision of the auxiliary ring 47 interposed in the registering grooves 45, 46 formed within the respective surfaces 25, 26, the latter surfaces are maintained in substantially complete radial alinement under all conditions. Further, any matter which might pass between the sealing surfaces 25, 26 must pass a plurality of closely spaced surfaces, in this instance five such surfaces. More specifically, these are the two radially extending mating portions of the surfaces 25, 26; the two axially extending surfaces provided by the sides of the ring 47 and the walls of the groove 45, 46; and the radially extending end surfaces of the ring 47 and the bottom wall of each of the grooves. The tortuous path thus created assures that there will be no transfer of oil or other matter between the members 20, 21.

Referring next to Fig. 4, a second embodiment of the invention is there illustrated which is generally similar to that described in connection with Figs. 1–3. The same reference numerals are employed in Fig. 4 to which the distinguishing suffix "a" has been added. One of the principal differences of construction illustrated by the second embodiment resides in the fact that the seal 10a is "reversed." That is, the base 24a and the first sealing member 20a are floatably connected by means of the pins 30a with the housing 11a so as to remain stationary. Correspondingly, the pins 36a of the second sealing member 21a are inserted into the recesses 32a in the flange 31a fast on the shaft 13a, so that the second sealing member rotates with the shaft. The operation is otherwise exactly as described in connection with Figs. 1–3.

It is also to be noted that in lieu of coiled compression springs as employed in the first embodiment, the second embodiment illustrated by Fig. 4 employs an annular "wave" type spring 35a interposed between the radial wall 29a and the first sealing member 20a to bias the latter into sealing engagement with the second sealing member 21a. Such a wavy spring is well known in the art and performs admirably in those applications where the sealing pressures required for holding the mating surfaces 25a, 26a in sealing engagement are not so great.

It will be observed that the sealing member 20a is provided with a key and slot connection at 33a, 34a for axial movement relative to the base 24a. By virtue of the fact that this connection is relatively loose and serves only to prevent rotation of the two parts, the sealing member 20a can otherwise shift or float, within limits, relative to its supporting base 24a. Correspondingly, the second sealing member 21a may shift relative to its supporting flange 31a by virtue of the loose connection between the pins 36a and their cooperating recesses 32a. Radial registry of the cooperating surfaces 25a, 26a is nevertheless maintained through the provision of opposed registering slots 45a, 46a receiving the opposite ends of an annular auxiliary ring 47a. Thus while the sealing members 20a and 21a are "floatably" mounted so that they are substantially immune to distortion of their sealing surfaces 25a, 26a upon distortions of the machine parts, they are held in radial alinement by the auxiliary ring 47a which, in addition, createst a tortuous path enhancing the sealing efficiency of such surfaces.

I claim:

1. In a rotary seal for preventing the transfer of matter between two relatively rotatable machine parts, the combination of an annular cartridge base having an axial side wall and a radial end wall, lost-motion means for connecting said base to one of said machine parts, a first annular sealing member, lost-motion means for connecting said member to said base, said member being rotationally fixed but radially and axially shiftable on said base, a second annular sealing member mounted on said base with rotational, axial and radial freedom with respect to said base, lost-motion means for connecting said second annular sealing member to the other of said machine parts, said sealing members having opposed radially extending end surfaces lapped for running, sealing engagement, spring means interposed between said first member and said end wall for axially biasing said end surfaces into sealing engagement, said end surfaces having opposed registering axial grooves therein, a ring having its opposite axial ends disposed in respective ones of said grooves with slight axial and radial clearance, a flexible, resilient boot having an axial portion sealed to the external surface of said first member and a radial portion turned radially inward and over the external side of said radial wall, and a resilient gasket on the end of said second sealing member remote from the lapped surface thereon, said resilient radial portion of said boot being interposed between the external side of said radial wall and the said one of said machine parts, and said gasket being interposed between the end of the second sealing member remote from the lapped surface thereon and the other of said machine parts, said boot and said gasket effecting sealing contact and affording relative movement between the base and said one of said machine parts and between said second sealing member and the other of said machine parts, respectively, upon deformation of the resilient material of said boot and said gasket.

2. In a rotary seal for preventing the transfer of matter between two relatively rotatable machine parts each having a plurality of circularly spaced, axial recesses, the said recesses in the respective machine parts being disposed in axial alinement with the open ends of said recesses in one machine part in axially spaced, opposed relation with the recesses in the other machine part, the combination of an annular cartridge base having an axial side wall and a radial end wall, a first annular sealing member rotationally fixed but radially and axially shiftable on said base, a second annular sealing member mounted on said base with rotational, axial and radial freedom with respect to said base, said sealing members having opposed radially extending end surfaces lapped for running, sealing engagement, spring means interposed between said first member and said end wall for axially biasing said end surfaces into sealing engagement, said end surfaces having opposed registering axial grooves therein, a ring having its opposite axial ends disposed in respective ones of said grooves with slight axial and radial clearance, a plurality of circularly-spaced, outward-extending axial pins on the external side of said radial wall and on that end of said second sealing member remote from the lapped surface thereon, said pins being undersize with respect to and receivable in the opposed, circularly-spaced, axial recesses in respective ones of said machine parts, a flexible, resilient boot having an axial portion sealed to the external surface of said first member and a radial portion turned radially inward and over the external side of said radial wall with the pins on said wall projecting through such radial portion, and a resilient gasket slipped over the pins on the end of said second sealing member remote from the lapped surface thereon, said resilient radial portion of said boot being interposed between the external side of said radial wall and the said one of said machine parts, and said gasket being interposed between the end of the second sealing member remote from the lapped surface thereon and the other of said machine parts, said boot and said gasket effecting sealing contact and affording relative movement between the base and said one of said machine parts and between said second sealing member and the other of said machine parts, respectively, upon deformation of the resilient material of said boot and said gasket.

References Cited in the file of this patent

UNITED STATES PATENTS

| | | |
|---|---|---|
| 1,327,002 | Williams | Jan. 6, 1920 |
| 1,845,363 | Thompson | Feb. 16, 1932 |
| 1,956,366 | Vedovell | Apr. 24, 1934 |
| 2,089,377 | Jehl | Aug. 10, 1937 |
| 2,243,255 | McDonald | May 27, 1941 |
| 2,396,319 | Edwards et al. | Mar. 12, 1946 |
| 2,489,781 | Isenbarger | Nov. 29, 1949 |
| 2,505,868 | Murphy | May 2, 1950 |
| 2,667,388 | Schick | Jan. 26, 1954 |